United States Patent [19]

James

[11] Patent Number: 4,758,908
[45] Date of Patent: Jul. 19, 1988

[54] METHOD AND APPARATUS FOR SUBSTITUTING A HIGHER QUALITY AUDIO SOUNDTRACK FOR A LESSER QUALITY AUDIO SOUNDTRACK DURING REPRODUCTION OF THE LESSER QUALITY AUDIO SOUNDTRACK AND A CORRESPONDING VISUAL PICTURE

[76] Inventor: Fred James, 31 Union Square West, New York, N.Y. 10003

[21] Appl. No.: 906,808

[22] Filed: Sep. 12, 1986

[51] Int. Cl.$^4$ .................... G11B 15/12; G11B 27/02
[52] U.S. Cl. ........................................ 360/61; 360/13
[58] Field of Search ............. 360/61, 63, 13, 26, 360/73

[56] References Cited

U.S. PATENT DOCUMENTS 4,357,636 11/1982 Takeromi et al. ................ 360/61

*Primary Examiner*—Vincent P. Canney
*Attorney, Agent, or Firm*—Thomas R. Morrison

[57] ABSTRACT

For use with master reproducing apparatus which reproduces a visual signal and a corresponding first audio signal, apparatus for substituting a second higher quality audio signal reproduced by slave reproducing apparatus for the first audio signal during reproduction of the visual signal and the first audio signal, includes a synchronier detector for detecting the amount of synchronization between the first and second audio signals in response to the first and second audio signals and for producing an error signal corresponding thereto; a controller for controlling the slave reproducing apparatus in response to the error signal, to bring the first and second audio signals into synchronization; and a switch for switching the first audio signal to a sound system when the first and second audio signals are out of synchronization, and for switching the second audio signal to the sound system when the first and second audio signals are in synchronization, in response to the controller, whereby the higher quality second audio signal is substituted for the first audio signal when synchronization is achieved between the second audio signal and the first audio signal.

11 Claims, 5 Drawing Sheets

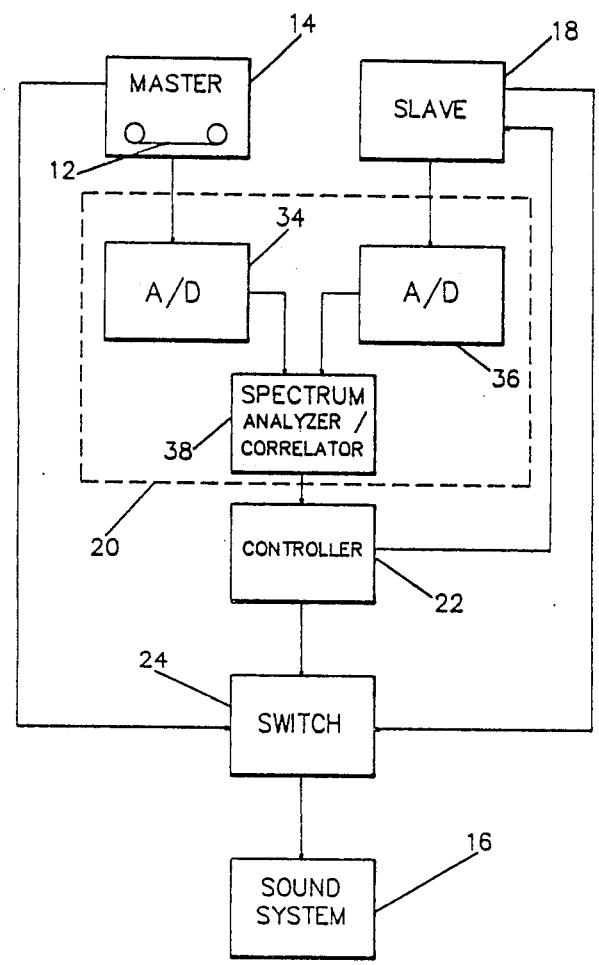

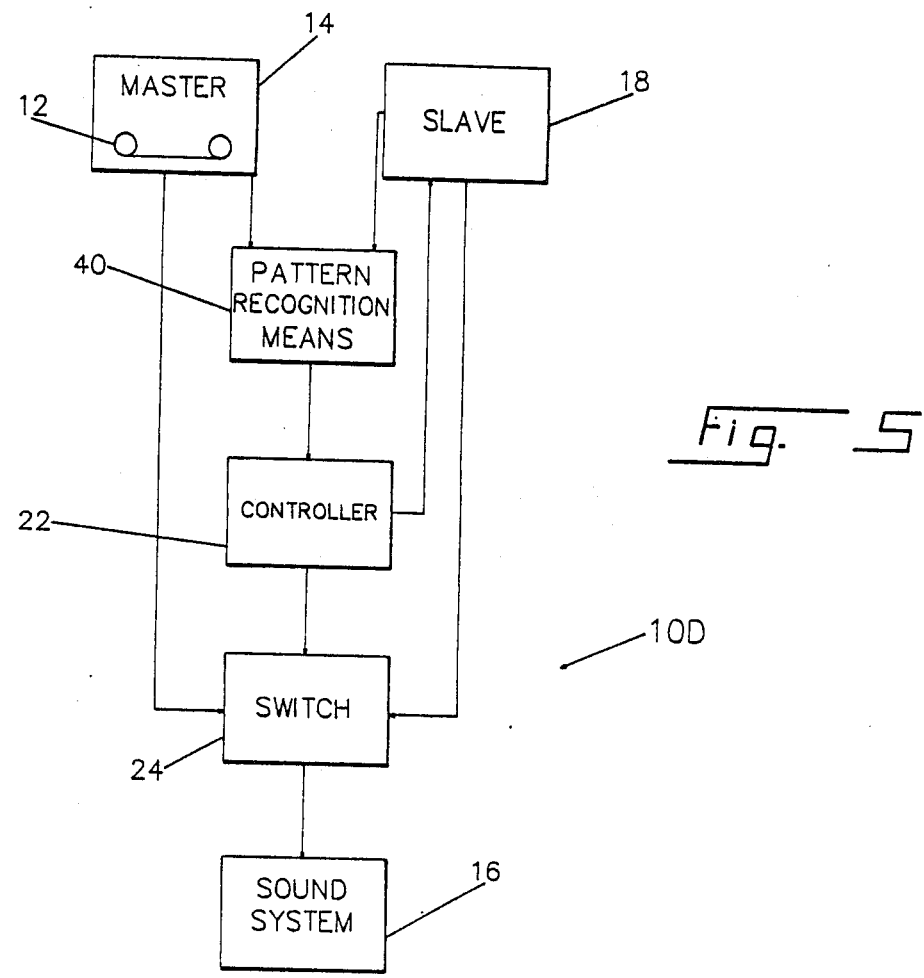

METHOD AND APPARATUS FOR SUBSTITUTING A HIGHER QUALITY AUDIO SOUNDTRACK FOR A LESSER QUALITY AUDIO SOUNDTRACK DURING REPRODUCTION OF THE LESSER QUALITY AUDIO SOUNDTRACK AND A CORRESPONDING VISUAL PICTURE

BACKGROUND OF THE INVENTION

The present invention relates generally to the reproduction of visual and audio information, and more particularly, is directed to a method and apparatus for substituting a higher quality audio signal recorded with the visual signal during reproduction of the latter.

When preparing motion pictures and the like for distribution, it is common practice to edit, dub, and make copies of the original. As a result, copies are made from copies of the original visual picture information and audio soundtrack. The sound in these multiple generation copies, however, loses fidelity in making the final film or video tape. For example, a seventh generation audio signal may eventually be used in the final version of the distributed film. This clearly is undesirable. Specifically, a seventh generation audio signal may have a signal to noise ratio of 30 db and a frequency response of 50 Hz-9 kHz, while a first generation audio signal recorded on a compact disc may have a signal to noise ratio of 96 db and a frequency response of 0 Hz-20 kHz.

One problem with substituting the higher quality audio signal for the final release audio signal is that of providing synchronization between the two audio signals, and thereby providing synchronization between the higher quality audio signal and the moving picture signal. This is because there is a lack of compatibiilty between different synchronization systems, particularly when different recording media are used. For example, a distributed motion picture may be recorded on film, and the higher quality audio signal may be recorded on a compact disc.

In this regard, the applicant herein has become aware of the following references.

U.S. Pat. No. 4,433,351 discloses a system which automatically adjusts the phase relation between signals reproduced from different tracks of the same magnetic tape, to be equal to the phase relation of the original signals, by adjusting rotation of the playback head. In this system, the two reproduced signals are supplied to zero crossing detectors, which supply outputs to monostable multivibrators. The outputs of the monostable multivibrators are supplied to a flip-flop circuit, the output of which is used to control the rotation of the playback head to adjust the phase relation between the signals.

U.S. Pat. No. 3,831,192 discloses a frequency deviation compensation system in which a pilot signal and information signal are both reproduced from the same tape. The signals are then supplied to zero crossing detectors, and the output from the zero crossing detector supplied with the pilot signal is compared with an oscillation signal. Dependent upon the frequency deviations detected in the pilot signal, pulses are added or subtracted from the pulses produced in response to the information signal. As a result, a utilization device is controlled, based upon an accumulation of overflow or underflow pulses.

U.S. Pat. No. 4,414,587 discloses a skew sensing apparatus for digital tape playback, in which digital data recorded on two tracks of the same tape is reproduced and supplied to parity bit lock-on circuits, which produce word clock signals in response thereto. These latter signals are supplied to a phase detector which detects the phase difference between the signals and adjusts the skew in response thereto.

U.S. Pat. No. 4,422,109 discloses a device for adjusting a magnetic recording/reproducing apparatus, based on the optimum bias of each magnetic tape that is used therewith. In this regard, the device uses a test signal which is recorded on and reproduced from the tape.

U.S. Pat. No. 4,559,569 discloses a circuit arrangement for correcting frequency response in view of the frequency response of a sound field.

OBJECTS AND SUMMARY OF THE INVENTION

Accordingly, it is an object of the present invention to provide a method and apparatus for substituting a higher quality audio soundtrack for a lesser quality audio soundtrack during reproduction of the lesser quality audio soundtrack and a corresponding moving picture.

It is another object of the present invention to provide a method and apparatus for substituting a higher quality audio soundtrack for a lesser quality audio soundtrack during reproduction of the lesser quality audio soundtrack and a corresponding moving picture, without the need to add any additional signals on any recording medium.

It is still another object of the present invention to provide a method and apparatus for substituting a higher quality audio soundtrack for a lesser quality audio soundtrack during reproduction of the lesser quality audio soundtrack and a corresponding moving picture, without the need to modify any existing apparatus.

It is yet another object of the present invention to provide a method and apparatus for substituting a higher quality audio soundtrack for a lesser quality audio soundtrack during reproduction of the lesser quality audio soundtrack and a corresponding moving picture, while maintaining the first and second audio signals in synchronization.

In accordance with an aspect of the present invention, for use with master reproducing apparatus which reproduces a moving picture signal and a corresponding first audio signal, apparatus for substituting a second higher quality audio signal reproduced by slave reproducing apparatus for the first audio signal during reproduction of the moving picture signal and the first audio signal, includes synchronizing means for detecting the amount of synchronization between the first and second audio signals in response to the first and second audio signals during reproduction of the same and for controlling the slave reproducing apparatus in response to the detection to bring the first and second audio signals into synchronization; and switch means for switching the first audio signal to a sound system when the first and second audio signals are out of synchronization, and for switching the second audio signal to the sound system when the first and second audio signals are in synchronization, in response to the synchronizing means, whereby the second higher quality audio signal is substituted for the first audio signal when synchronization is achieved between the second audio signal and the first audio signal.

In accordance with another aspect of the present invention, for use with master reproducing apparatus which reproduces a visual signal and a corresponding first audio signal, a method of substituting a second higher quality audio signal reproduced by slave reproducing apparatus for the first audio signal during reproduction of the visual signal and the first audio signal, includes the steps of detecting the amount of synchronization between the first and second audio signals in response to the first and second audio signals during reproduction of the same; controlling the slave reproducing apparatus in response to the detection to bring the first and second audio signals into synchronization; switching the first audio signal to a sound system when the first and second audio signals are out of synchronization, in response to the detection; and switching the second audio signal to the sound system when the first and second audio signal to the second system when the first and second audio signals are in synchronization, in response to the detection; whereby the second higher quality audio signal is substituted for the first audio signal when synchronization is achieved between the second audio signal and the first audio signal.

The above and other objects, features and advantages of the present invention will become readily apparent from the following detailed description which is to be read in connection with the accompanying drawings.

BRIEF DESCRIPTION OF THE DRAWINGS

FIG. 4 is a block diagram of still another embodiment of apparatus for substituting according to the present invention; and FIG. 5 is a block diagram of yet another embodiment of apparatus for substituting according to the present invention.

DETAILED DESCRIPTION OF THE PREFERRED EMBODIMENTS

Figure 1:
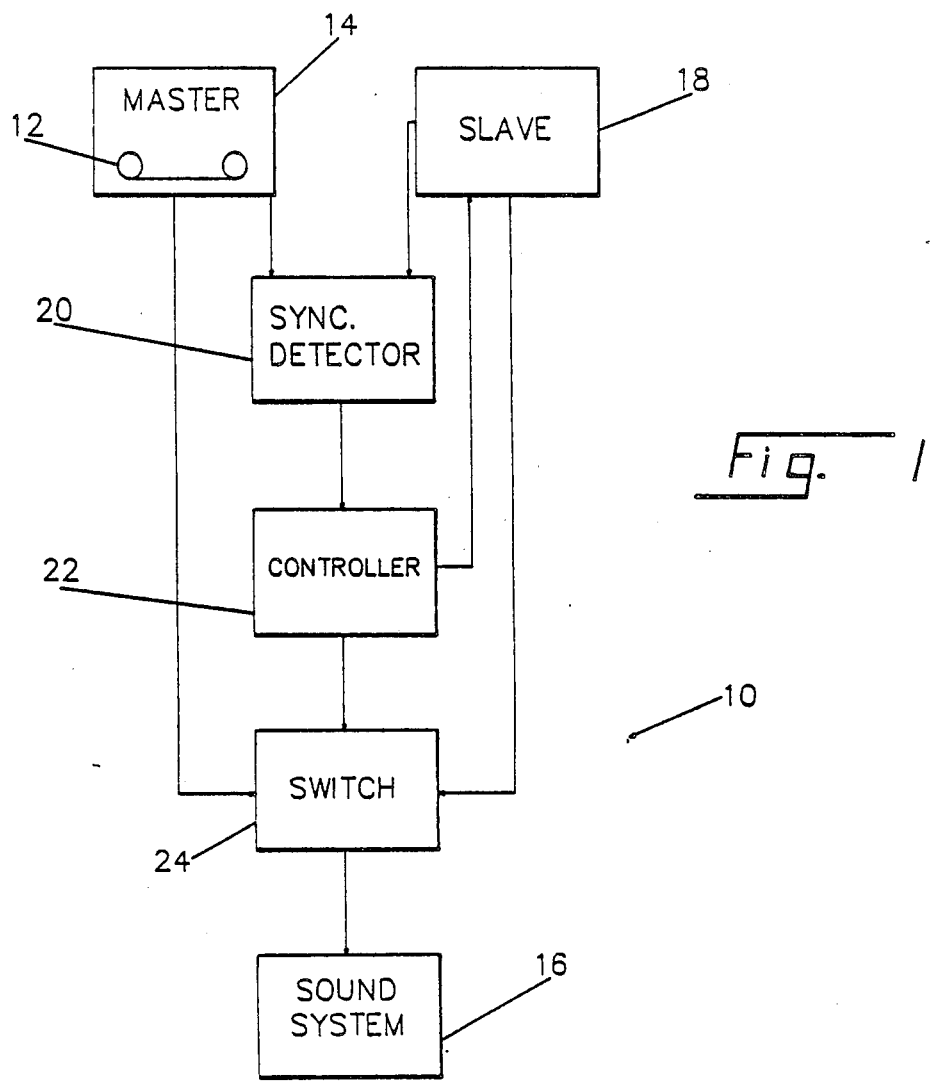
FIG. 1 is a generic block diagram of apparatus for substituting according to the present invention.

As described above, because of multiple generation copying when preparing a motion picture or the like for distribution, the quality of the audio soundtrack is greatly deteriorated. Furthermore, the final release medium, such as optical sound or VHS is very poor compared to the CD or high quality tape. For example, a final release copy of the audio soundtrack may be recorded on the same film, tape, or the like with the moving picture information, when the film, tape or the like is finally distributed. This, of course, results in a loss in fidelity. Hereinafter, for ease of explanation, the multiple generation copy of the audio soundtrack which is recorded with the visual information, will be referred to as the final release copy.

In accordance with the present invention, a first or other high quality generation copy of the original soundtrack for the motion picture, is used with the visual picture in place of the final release audio soundtrack of the motion picture. The first generation copy is recorded on another medium, such as a compact disc, a tape, a record disc or the like. In accordance with the present invention, this substitution is accomplished by simultaneously reproducing both the first generation copy of the original soundtrack with the final release copy and visual picture.

Initially, during such reproduction, the final release copy, which is recorded on the same recording medium as the visual information, is used with the visual picture. During this initial stage, movement of the other recording medium containing the high quality copy is adjusted so as to synchronize the first and final release copies of the audio soundtrack with each other. Such synchronization is based only on the first and conventional normal low-quality final release audio signals themselves, without requiring any additional signals to be recorded therewith, such as pilot signals, time code signals and the like. Once synchronization is achieved, switching circuitry cuts out the final release audio signal and uses the higher quality first generation audio signal in place thereof. As a result, fidelity of the audio signal is greatly improved.

However, during the entire time that the motion picture is playing, both the first and final release audio signals are continuously being compared, to insure that the high quality audio signal is always in synchronization with the final release audio signal, and therefore, is always in synchronization with the reproduced visual picture. In the event that the two audio signals become out of synchronization by a predetermined amount, which may result, for example, due to drop-outs in the high quality audio signal, the switching circuitry cuts out the high quality audio signal and uses the final release audio signal in place thereof, until the two audio signals again become synchronized.

It will be appreciated that with this invention, since the actual audio signals are used to provide synchronization, there is no need to add any signals to the original film, such as pilot signals, time code signals and the like. Further, there is no need to modify existing reproducing apparatus. Rather, it is only necessary to route the audio signals through an external device, which contains the necessary synchronization and switching circuitry.

Referring now to FIG. 1, there is shown a generic apparatus 10 according to a first embodiment of the present invention for substituting the high quality audio signal for the final release audio signal during reproduction of the final release audio signal and corresponding visual picture. As shown, the final release audio signal and the visual signal are recorded on a recording medium, such as film, magnetic tape or the like 12, and reproduced in a master reproduction device 14. For example, master reproduction device 14 may be any conventional projector of the type typically used in movie theatres, a video tape recorder, or the like. In such case, the audio output of master reproduction device 14 typically is connected to a sound system 16, for example, which may be comprised of a plurality of loudspeakers placed at different locations around a movie theatre.

In accordance with the present invention, the first generation copy of the audio signal, which may be recorded on any suitable medium, such as a compact disc, magnetic tape, film or the like, is simultaneously reproduced by a variable speed slave reproduction device 18. The final release audio signal output from master reproduction device 14 and the first generation audio signal output from slave reproduction device 18 are both input to a synchronizer detector 20 which detects the amount of synchronization between the two audio signals. In response thereto, synchronizer detector 20 supplies an error signal dependent upon the direction and extent that the two audio signals are out of synchronization with each other to a controller 22 which controls the speed of slave reproduction device 18 to reduce this error signal to zero, and to thereby synchronize both audio signals.

In addition, the high quality and final release audio signals are supplied to a switch 24, which is also controlled by controller 22 to supply either the first or final release audio signal to sound system 16, dependent upon whether there is synchronization between the two audio signals, as detected by synchronizer detector 20.

Initially, the high quality and final release audio signals will probably be out of synchronization. In such case, controller 22 controls switch 24 to supply the final release audio signal from master reproduction device 14 to sound system 16. Once synchronization is achieved, controller 22 controls switch 24 to supply only the first generation audio signal from slave reproduction device 18 to sound system 16. During subsequent reproduction of the visual signal, synchronizer detector 20 continuously compares the first and final release audio signals. In the event that these signals are out of synchronization, controller 22 again controls switch 24 to supply the final release audio signal from master reproduction device 14 to sound system 16. When the first and final release audio signals again become synchronized, controller 22 controls switch 24 to supply the first generation audio signal from slave reproduction device 18. This ensures that the best sound quality is reproduced at all times.

Figure 2:
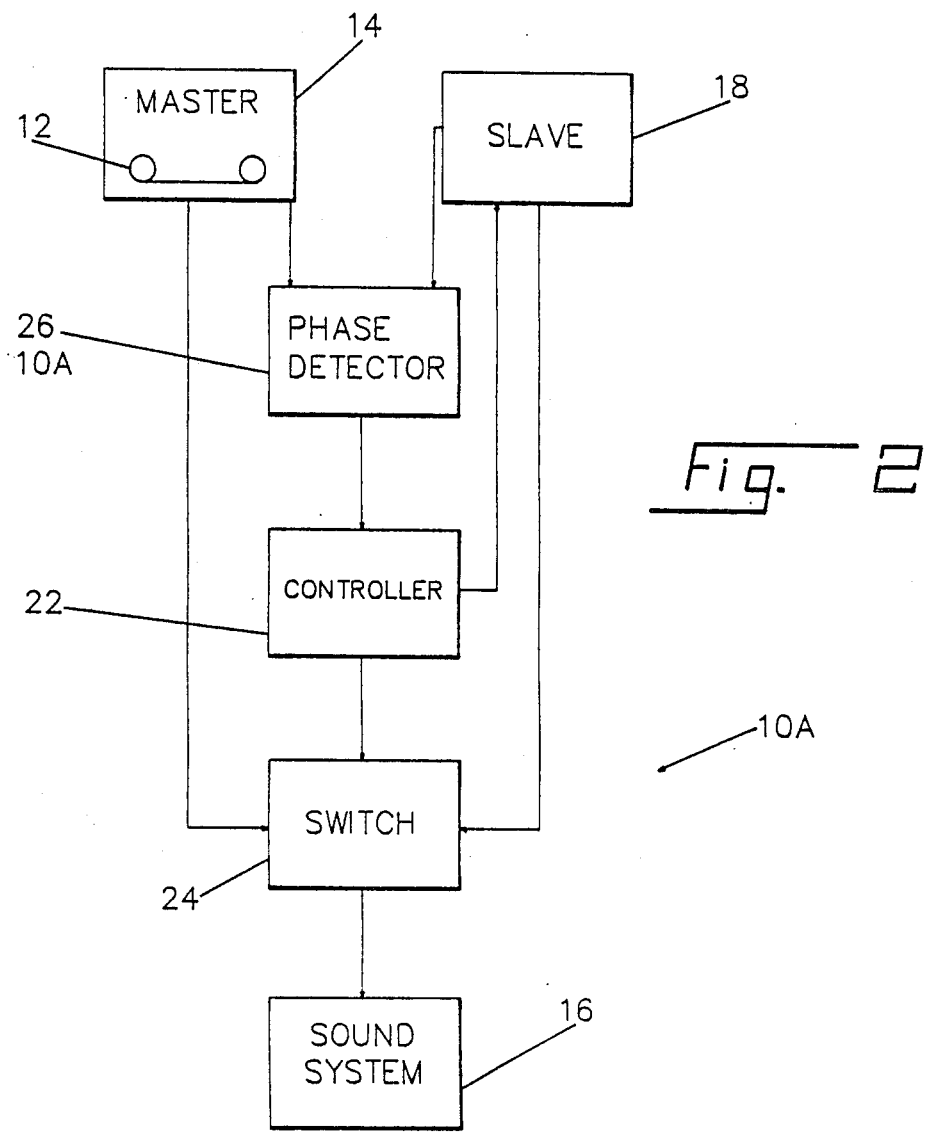
FIG. 2 is a block diagram of one embodiment of apparatus for substituting according to the present invention.

In accordance with an embodiment of apparatus 10a according to the invention, as shown in FIG. 2, synchronizer detector 20 is comprised of a phase detector 26 which measures the phase difference between the first and final release audio signals, and produces the aforementioned error signal in response thereto. When the phase of the first generation audio signal is advanced with respect to the final release audio signal, the error signal has a first polarity corresponding to such phase advance, whereby controller 22 slows down the speed of slave reproduction device 18. On the other hand, when the phase of the first generation audio signal is delayed with respect to the final release audio signal, the error signal has a second opposite polarity corresponding to such phase delay, whereby controller 22 speeds up slave reproduction device 18. The amount that slave reproduction device 18 is slowed down or sped up depends upon the level of the error signal.

Figure 3:
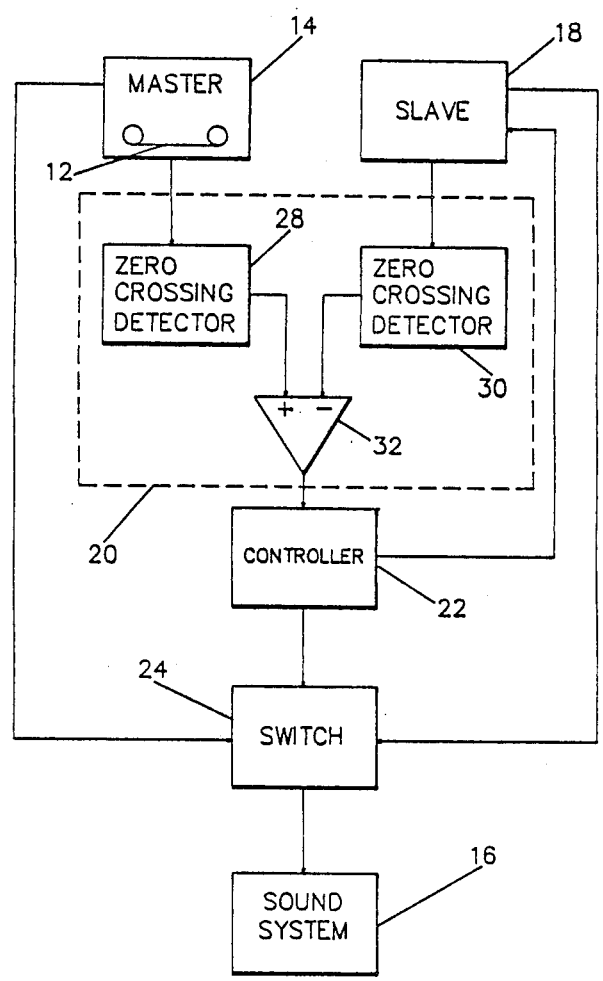
FIG. 3 is a block diagram of another embodiment of apparatus for substituting according to the present invention.

Another way to achieve synchronization according to the present invention is shown in apparatus 10b of FIG. 3, which uses zero crossing detectors 28 and 30. Specifically, an analog audio signal is an oscillating signal which continuously crosses above and below a predetermined zero axis. Accordingly, the final release audio signal from master reproducing device 14 is supplied to zero crossing detector 28, which counts the number of zero point crossings and produces a zero count signal corresponding thereto. In like manner, the first generation audio signal from slave reproduction device 18 is supplied to zero crossing detector 30, which counts the number of zero point crossings and produces a zero count signal corresponding thereto. The zero count signals from zero crossing detectors 28 and 30 are supplied to a comparator 32. When the number of zero point crossings for the two audio signals, as measured by the zero count signals are different, comparator 32 supplies an error signal to controller 22. In response thereto, controller 22 varies the speed of slave reproduction device 18 to synchronize the two audio signals. In addition, at this time, controller 22 controls switch 24 to supply the final release audio signal from master reproduction device 14 to sound system 16. Once synchronization is achieved, that is, once the zero count signals supplied to comparator 32 are equal, comparator 32 supplies an appropriate signal to controller 22 which, in turn, controls switch 24 to supply the first generation audio signal to sound system 16. At the same time, controller 22 continuously controls the speed of slave reproduction device 18 to ensure that the first generation audio signal remains in synchronization with the final release audio signal, and therefore, with the reproduced visual picture.

Another way to achieve synchronization according to the present invention, is to correlate the first and final release audio signals, as shown by apparatus 10c of FIG. 4. As shown in FIG. 4, one way of achieving correlation is to use a spectrum/correlater analyzer. Specifically, the final release audio signal from master reproduction device 14 is converted to a digital signal in an analog-to-digital (A/D) converter 34 and, in like manner, the first generation audio signal from slave reproduction device 18 is converted to a digital signal in an analog-to-digital (A/D) converter 36. Preferably, at least slave reproduction device 18 uses SMPTE time codes.

Thus, the digitized audio signals from A/D converters 34 and 36 are supplied to a spectrum/correlater analyzer 38, such as a Model 660B dual channel spectrum analyzer manufactured by Wavetek Scientific, Inc. of Rockleigh, N.J., which automatically provides an indication of the correlation between the digitized audio signals. Specifically, the maximum correlation score from the 660B spectrum analyzer will indicate the appropriate point of the SMPTE time code from slave reproduction device 18 where the tracks of the master and slave reproduction devices 14 and 18 would match up. Thus, 660B spectrum/correlater analyzer 38 supplies a signal to controller 22, which can be a DAE Model 1100 digital audio editor manufactured by Sony Corporation, that is triggered by spectrum analyzer 38 to drive slave reproducing device 18 to synchronization in accordance with the correlation scores therefrom. Specifically, spectrum/correlater analyzer 38 supplies a signal to DAE Model 1100 controller 22 that tells the latter what time code to go to, and in response thereto, slave reproduction device 18 is driven to that time code, whereby the first and final release audio signals become synchronized.

As another alternative, synchronizer detector 20 and controller 22 can be combined into a single unit, such as a Compusonics Model DSP-2002 computer which is conventionally used for digital editing. Such computer will determine the amount of correlation between the two audio signals and will control slave reproduction device 18 in response thereto. Alternatively, a CMX Model "New Cass 1" computer can be used in place of the Compusonics computer to perform the same functions. An off the shelf computer program that will perform the desired operations is sold by MicroWay, Inc. of Kingston, Mass. under the trademark "87FFT."

As an example, using correlation scores, suppose that a correlation score of 32 is desired; and that there are two video tape recorders, with the slave tape recorder 18 running at 24 frames per second (fps) and the master tape recorder 14 running slightly ahead of slave tape recorder 18. If slave tape recorder 18 is sped up by 10% to approximately 26.4 fps, the correlation scores start to increase. When the correlation scores consistently reach a value of 40, slave tape recorder 18 is slowed down to a value of approximately 5% greater than 24 fps, that is, to 25.2 fps. If, for example, the correlation scores consistently reach, say, a value of 50, slave tape recorder 18 is slowed down to a value of approximately 2.5% greater than 24 fps, that is, to 24.6 fps. Once the desired correlation score is achieved, a constant process of jogging back and forth is performed while both tape recorders 14 and 18 are running, so that continuous speed corrections are made to maintain synchronization.

Another way of achieving correlation in accordance with the present invention is to use pattern recognition, as shown by apparatus 10d in FIG. 5. As shown therein, the embodiment of FIG. 5 is identical to the embodiment of FIG. 1, with the pattern recognition means 40 constituting the synchronizer detector. In such case, the audio signal waveforms per unit time are converted into several symbols. In pattern recognition, it is the symbols that are compared to determine the amount of correlation between the two audio signals. Pattern recognition is a preferred embodiment of the present invention, because minor discrepancies such as noise or distortion will have minimal or no effect on the correlation process, a minimum amount of data is needed and used, and pattern recognition can be performed more efficiently and quickly than other methods.

The use of pattern recognition techniques is well known in the art. For example, an SP1000 chip made by General Instruments can be used with an Apple or Commodore 64 computer. In like manner, a PF 474 pattern recognition chip sold by Proximity Technology Inc. of Ft. Lauderdale, Fla. and described in detail in U.S. Pat. No. 4,490,811, the entire disclosure of which is incorporated herein by reference, can be used. This chip is also discussed in an article by Steve Rosenthal. "The PF 474" in Byte Magazine, November, 1984, pages 247-253 and an article by one of the inventors of the chip, Peter N. Yianilos, "A Dedicated Comparator Matches Symbol Strings Fast and Intelligently" in Electronics Magazine, Dec. 1, 1983. The PF 474 pattern recognition chip is presently sold as part of a PF-PC board which plugs into an IBM-PC Personal Computer, and which contains support circuitry, mostly composed of a direct memory access (DMA) on the PF-PC board.

Thus, with the present invention, the actual audio signals are used to provide synchronization. There is thus no need to record any additional signals to provide synchronization, or to modify existing reproducing apparatus.

It will be appreciated, however, that various modifications can be made to the present invention, which are within the scope of the claimed invention. For example, in addition to detecting synchronization between the two audio signals, suitable circuitry could be provided for detecting which audio signal has better quality. This can be accomplished, for example, by detecting the signal to noise ratio of the two signals, and switching the signal that has the better signal to noise ratio, once synchronization is achieved. Thus, for example, synchronization may be achieved, but there may be dropouts or the like in the first generation audio signal. In such case, the final release audio signal would be supplied to the sound system.

Having described specific preferred embodiments of the invention with reference to the accompanying drawings, it will be appreciated that the present invention is not limited to those precise embodiments, and that various changes and modifications can be effected therein by one of ordinary skill in the art without departing from the spirit or scope of the invention as defined in the appended claims.

What is claimed is:

1. For use with master reproducing apparatus which reproduces a visual signal and a corresponding first audio signal, apparatus for substituting a second higher quality audio signal reproduced by slave reproducing apparatus for said first audio signal during reproduction of said visual signal and said first audio signal, comprising:

synchronizing means for detecting the amount of synchronization between said first and second audio signals in response to said first and second audio signals during reproduction of the same and for controlling said slave reproducing apparatus in response to said detection to bring said first and second audio signals into synchronization;

switch means for switching said first audio signal to a sound system when said first and second audio signals are out of synchronization, and for switching said second audio signal to the sound system when said first and second audio signals are in synchronization, in response to said synchronizing means;

whereby the second higher quality audio signal is substituted for the first audio signal when synchronization is achieved between the second audio signal and the first audio signal.

2. Apparatus according to claim 1; wherein said synchronizing means includes:

synchronizer detector means for detecting the amount of synchronization between said first and second audio signals in response to said first and second audio signals during reproduction of the same and for producing an error signal corresponding thereto; and controller means for controlling said slave reproducing apparatus in response to said error signal, to bring said first and second audio signals into synchronization.

3. Apparatus according to claim 2; wherein said synchronization detector means includes phase comparator means for detecting the phase difference between said first and second audio signals and for producing said error signal corresponding thereto; and said controller means controls said slave reproducing means in response to said error signal.

4. Apparatus according to claim 2; wherein said synchronization detector means includes first zero crossing detector means for detecting the number of zero point crossings of said first audio signal and for producing a first zero crossing signal in response thereto; second zero crossing detector means for detecting the number of zero point crossings of said second audio signal and for producing a second zero crossing signal in response thereto; and comparator means for producing said error signal in response to said first and second zero crossing signals.

5. Apparatus according to claim 2; wherein said synchronization detector means includes first analog-to-digital converter means for converting said first audio signal into a first digital audio signal; second analog-todigital converter means for converting said second audio signal into a second digital audio signal; and correlater means for comparing the digital bit stream of said first and second digital audio signals and producing said error signal in response thereto.

6. Apparatus according to claim 2; wherein said synchronization detector means includes pattern recognition means for converting said first and second audio signals into first and second patterns of symbols, respectively, for detecting the correlation between said first and second patterns and for producing said error signal in response thereto.

7. For use with master reproducing apparatus which reproduces a visual signal and a corresponding first audio signal, a method of substituting a second higher quality audio signal reproduced by slave reproducing apparatus for said first audio signal during reproduction of said visual signal and said first audio signal, comprising the steps of:

- detecting the amount of synchronization between said first and second audio signals in response to said first and second audio signals during reproduction of the same;
- controlling said slave reproducing apparatus in response to said detection to bring said first and second audio signals into synchronization;
- switching said first audio signal to the sound system when said first and second audio signals are out of synchronization, in response to said detection; and
- switching said second audio signal to the sound system when said first and second audio signals are in synchronization, in response to said detection;
- whereby the higher quality second audio signal is substituted for the first audio signal when synchronization is achieved between the second audio signal and the first audio signal.

8. A method according to claim 7; wherein said step of detecting the phase difference between said first and second audio signals; and said step of controlling includes the step of controlling said slave reproducing apparatus in response to said phase detection to bring said first and second audio signals into synchronization.

9. A method according to claim 7; wherein said step of detecting includes the steps of detecting the number of zero point crossings of said first audio signal and producing a first zero crossing signal in response thereto; detecting the number of zero point crossings of said second audio signal and producing a second zero crossing signal in response thereto; and producing an error signal in response to said first and second zero crossing signals; and said step of controlling includes the step of controlling said slave reproducing apparatus in response to said error signal to bring said first and second audio signals into synchronization.

10. A method according to claim 7; wherein said step of detecting includes the steps of converting said first audio signal into a first digital audio signal; converting said second second audio signal into a second digital audio signal; correlating the digital bit stream of said first and second digital audio signals; and producing an error signal in response thereto; and said step of controlling includes the step of controlling said slave reproducing apparatus in response to said error signal to bring said first and second audio signals into synchronization.

11. Apparatus according to claim 7; wherein said step of detecting includes the step of converting said first audio signal into a first pattern of symbols; converting said second audio signal into a second pattern of symbols; detecting the correlation between said first and second patterns; and producing an error signal or doing a search to match up symbol patterns in response thereto; and said step of controlling includes the step of controlling said slave reproducing apparatus in response to said signal and match to bring said first and second audio signals into synchronization.

* * * * *